(12) United States Patent
Klein et al.

(10) Patent No.: US 9,637,359 B2
(45) Date of Patent: May 2, 2017

(54) DRIVE FOR A SLIDING CONNECTING MEMBER OF A LOCKING SYSTEM OF A TELESCOPIC SYSTEM OF A CRANE JIB

(71) Applicant: Terex Cranes Germany GmbH, Zweibrücken (DE)

(72) Inventors: Ascan Klein, Käshofen (DE); Thilo Jene, Spiesen (DE); Frank Conrad, Hornbach (DE)

(73) Assignee: TEREX GLOBAL GMBH, Schafthausen (CH)

( * ) Notice: Subject to any disclaimer, the term of this patent is extended or adjusted under 35 U.S.C. 154(b) by 299 days.

(21) Appl. No.: 14/537,065

(22) Filed: Nov. 10, 2014

(65) Prior Publication Data

US 2015/0128735 A1    May 14, 2015

(30) Foreign Application Priority Data

Nov. 11, 2013   (DE) .................... 20 2013 010 381 U

(51) Int. Cl.
*B66C 23/70*      (2006.01)
*F16H 21/44*     (2006.01)

(52) U.S. Cl.
CPC ........... *B66C 23/708* (2013.01); *F16H 21/44* (2013.01); *Y10T 74/18992* (2015.01)

(58) Field of Classification Search
CPC .................................................. B66C 23/708
See application file for complete search history.

(56) References Cited

U.S. PATENT DOCUMENTS

| 3,749,254 A | * | 7/1973 | Grider ................... B66C 23/708 |
| | | | 212/292 |
| 4,664,272 A | | 5/1987 | Mentzer | |
| 4,688,690 A | * | 8/1987 | Gattu .................... B66C 23/708 |
| | | | 212/292 |
| 5,370,011 A | | 12/1994 | Gilges et al. |
| 6,400,047 B1 | | 6/2002 | Hartramph et al. |

(Continued)

FOREIGN PATENT DOCUMENTS

| DE | 4127487 A1 | 3/1993 |
| DE | 19546661 A1 | 6/1997 |

(Continued)

OTHER PUBLICATIONS

Search Report for German Application No. DE 20 2013 010 381.7 dated Sep. 11, 2014; 5 pages.

*Primary Examiner* — Terence Boes
(74) *Attorney, Agent, or Firm* — Cantor Colburn LLP

(57) ABSTRACT

A drive of a sliding connecting member of a locking system of a telescopic system, having a telescopic cylinder (1) with an outer telescopic section (2, 3) and an inner telescopic section (6, 7), which are each provided with a locking hole (5) into which a locking bolt (11) can be entered and withdrawn in a releasable manner via the sliding connecting member (14), provided with a sliding path (12), and a grasper (10), wherein the locking bolt (11) is designed to be moveable by means of an engagement member (9) running in the sliding path (12) in such a way that the locking bolt (11) effects a linear movement and the jib sections (3, 6) can be connected to one another by insertion of the locking bolt (11) into the bolting hole (5) and the sliding connecting member (14) can be driven by an electric linear drive (4).

8 Claims, 3 Drawing Sheets

(56) References Cited

U.S. PATENT DOCUMENTS

2003/0057172 A1* 3/2003 Harrington ........... B66C 23/708
                                                                               212/292
2003/0071004 A1* 4/2003 Higgins ................ B66C 23/701
                                                                               212/292

FOREIGN PATENT DOCUMENTS

| DE | 19824671 A1 | 12/1998 |
| DE | 19811813 A1 | 9/1999 |
| DE | 19853942 C1 | 7/2000 |
| DE | 20007393 U1 | 8/2001 |
| DE | 202008007906 U1 | 11/2009 |
| DE | 202008007904 U1 | 12/2009 |
| EP | 2835336 A1 | 2/2015 |
| GB | 2053149 A | 2/1981 |

* cited by examiner

DRIVE FOR A SLIDING CONNECTING MEMBER OF A LOCKING SYSTEM OF A TELESCOPIC SYSTEM OF A CRANE JIB

CROSS REFERENCE TO RELATED APPLICATION

This application claims the benefit of German Application DE 202013010381.7, filed Nov. 11, 2013, the contents of which are incorporated herein by reference thereto.

FIELD OF THE INVENTION

The invention relates to the drive of a sliding connecting member of a locking system of a telescopic system, having a telescopic cylinder with an outer telescopic section and an inner telescopic section, which are each provided with a locking hole into which a locking bolt can be entered and withdrawn in a releasable manner via the sliding connecting member, provided with a sliding path, and a grasper, wherein the locking bolt is designed to be moveable by means of an engagement member running in the sliding path in such a way that the locking bolt effects a linear movement and the jib sections can be connected to one another by insertion of the locking bolt into the bolting hole.

BACKGROUND

Telescopic sections for mobile crane jibs are known for example from DE 198 11 813 A1. In this known mobile crane jib, the locking bolts are guided in an inner telescopic section and pretensioned radially outwards by means of a spring. Thus, the locking bolt is designed on its outer end such that it can engage in a receiver provided in an outer telescopic section surrounding the inner telescopic section. Furthermore, a release device is provided which engages with the inner end of a locking bolt in order to release the locked position thereof against the spring biasing.

The actuation of the locking bolts is effected by means of a hydraulic drive. A disadvantage of this is that hydraulic lines are required which must be passed inside or outside the telescopic jib to the locking system. This involves an increased amount of space, more weight and assembly work which are in turn associated with additional costs. Furthermore, the build up of pressure within the hydraulic lines is dependent on various external influences, particularly the temperature and line length when using a telescopable oil guide. Moreover, valves are required to control such locking and these make additional laying of electric cables in the locking system necessary.

SUMMARY OF THE INVENTION

One object of the present invention is to create a device for actuating and locking telescopic sections, particularly telescopic sections of a jib of a mobile crane, which overcomes the above-mentioned disadvantages, is compact in construction, requires little maintenance and is protected from external influences.

This object may be achieved by the fact that the sliding connecting member can be driven by an electric linear drive. Further advantageous embodiments of the invention are the subject of the subordinate claims.

In one advantageous development of the invention, provision is made that the electric linear drive is connected to a control unit via a cable and can be controlled by a control unit, wherein the cable can be fed to the control unit via a cable drum. Such cable drums are carried along on the telescopic crane and are frequently located in the region behind the telescopic unit. Therefore the already present electric power supply is used to supply the electrically driven securing and bolting unit, whereby this remains as the single power supply to be provided in the telescopic unit. In addition to the advantages of the solution in accordance with the invention as previously mentioned, in particular a separate hydraulic unit for supplying the securing and bolting unit is thus not required.

In a further advantageous embodiment of the invention, provision is made that the control unit is connected to the securing and bolting unit via a cable.

In a further advantageous embodiment of the invention, provision is made that the electric linear drive is provided with an integrated sensing system for location detection or with a separate position detection means for a connection of the sliding connecting member to the linear drive.

Further embodiments in accordance with the invention make provision for the electric linear drive to be provided with a mechanical self-locking means or for the electric linear drive to be provided with a holding brake and for the mechanical self-locking means or holding brake to be able to hold an approached position of the linear drive without application of electric power.

One embodiment in accordance with the invention makes provision that in order for two telescopic sections to be bolted to one another, two bolting holes are provided in each case, wherein the lateral bolting holes are disposed opposite one another and are bolted to one another by a respective dedicated locking bolt.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
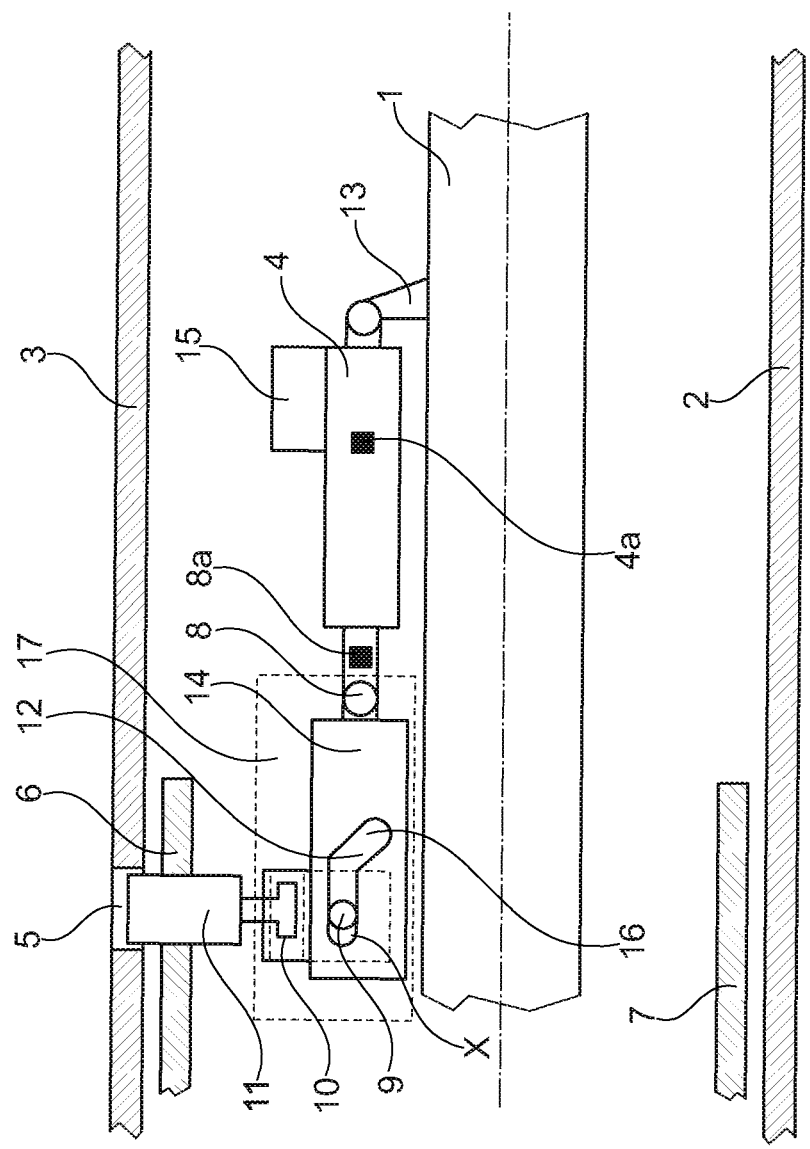
FIG. 1 shows the schematic side view in vertical cross-section of the situation along the longitudinal axis of the telescopic cylinder which extends in an inner telescopic section and an outer telescopic section surrounding the inner telescopic section, wherein the inner telescopic section and the outer telescopic section can be locked to one another with a locking bolt which can be radially displaced into bolting holes, the radial connection of both telescopic sections extends vertically at a right angle to the longitudinal axis of the telescopic cylinder, the vertically radial movement of the locking bolt is effected by means of an engagement member of a sliding connecting member running in a sliding path and the sliding connecting member can be actuated by a linear drive connected to the telescopic cylinder.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 shows in cross-section with respect to the longitudinal axis, a telescopic cylinder 1 is provided to extend a mobile crane jib, not shown in more detail. The mobile crane jib has an outer telescopic section consisting of a lower shell 2 and an upper shell 3, and an inner telescopic section which can be displaced in a longitudinally axial manner in the outer telescopic section 2, 3 and consists of a lower shell 7 and an upper shell 6. For locking and securing purposes, the upper shell 6 of the inner telescopic section can be connected to the upper shell 3 of the outer telescopic section. Extending out of the upper shell 6 of the inner telescopic section, a locking bolt 11 can be inserted for this purpose radially into a bolting hole 5 in the upper shell 3 of the outer telescopic section.

For radial displacement of the locking bolt 11, the securing and bolting unit 17 located on the telescopic cylinder 1 is provided in accordance with the invention with an electric linear drive 4. The electric linear drive 4 is connected to the telescopic cylinder 1 at one end via a connection 13 and is connected to a sliding connecting member 14 on the side opposite the connection 13 via a connection 8. The sliding connecting member 14 has a sliding path 12 in which an engagement member 9 is guided.

The engagement member 9 is operatively connected to the locking bolt 11 via a grasper 10. The sliding path 12 is provided with a sliding path end 16. The mechanical transmission effect is brought about by the longitudinally axial displacement of the sliding connecting member 14, caused by the engagement member 9 which is guided along the sliding path 12 within the sliding connecting member 14, from the sliding path end 16 to a locking position X. In the event of a longitudinally axial displacement of the sliding connecting member 14, the locking bolt 11 is pushed by the operational relationship between the engagement member 9 and the grasper 10 radially outwards in the vertical direction into the bolting hole 5 in the upper shell 3 of the outer telescopic section, whereby the inner telescopic section and the outer telescopic section are locked to one another. The electric linear drive 4 is provided with an integrated sensing system 4a for location detection or with a separate position detection means 8a for a connection of the sliding connecting member 14 to the linear drive.

Figure 2:
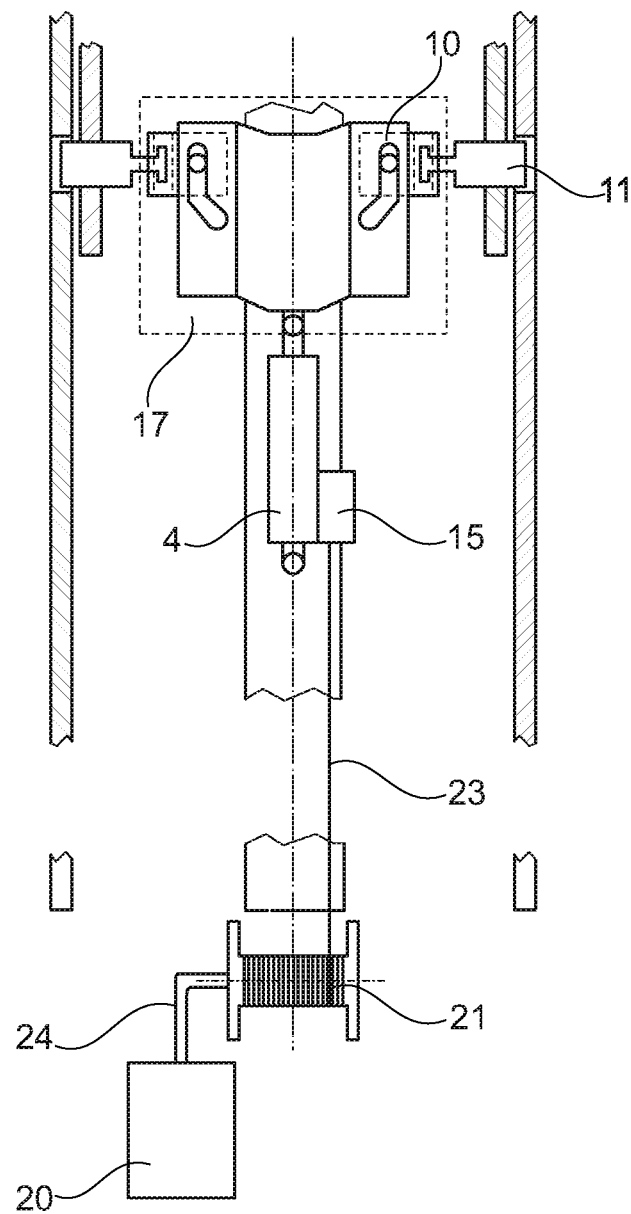
FIG. 2 shows the schematic plan view, in horizontal cross-section, of a telescopic cylinder according to FIG. 1, with an electrical supply line for the electric linear drive in accordance with the invention, the supply cable can be wound onto a cable drum, having a control unit which controls the linear drive, wherein the inner telescopic section and the outer telescopic section can be locked to one another by two locking bolts which can be radially displaced into bolting holes, the radial connection of the two telescopic sections extends horizontally at a right angle to the longitudinal axis of the telescopic cylinder, the horizontal radial movement of the locking bolt is effected by means of an engagement member of a sliding connecting member running in a sliding path, and the sliding connecting member can be actuated by a linear drive connected to the telescopic cylinder, wherein both the cable drum and also the control unit and the connection between the cable drum and control unit lie outside the telescopic unit in this illustration.

As shown in FIG. 2, the linear drive 4 is allocated an electric connection 15 which can be supplied with electric driving power for the electric linear drive 4 via an electric cable 23. The cable 23 is of variable length and can be rolled onto and off a cable drum 21.

The control of the electric linear drive 4 is effected via an electric control unit 20 which is connected to the cable drum 21 via a cable 24, wherein the possibility of disposing the cable drum 21 and also the control unit 20 and the connection between the cable drum 21 and control unit 20 within the telescopic unit is not shown.

Figure 3:
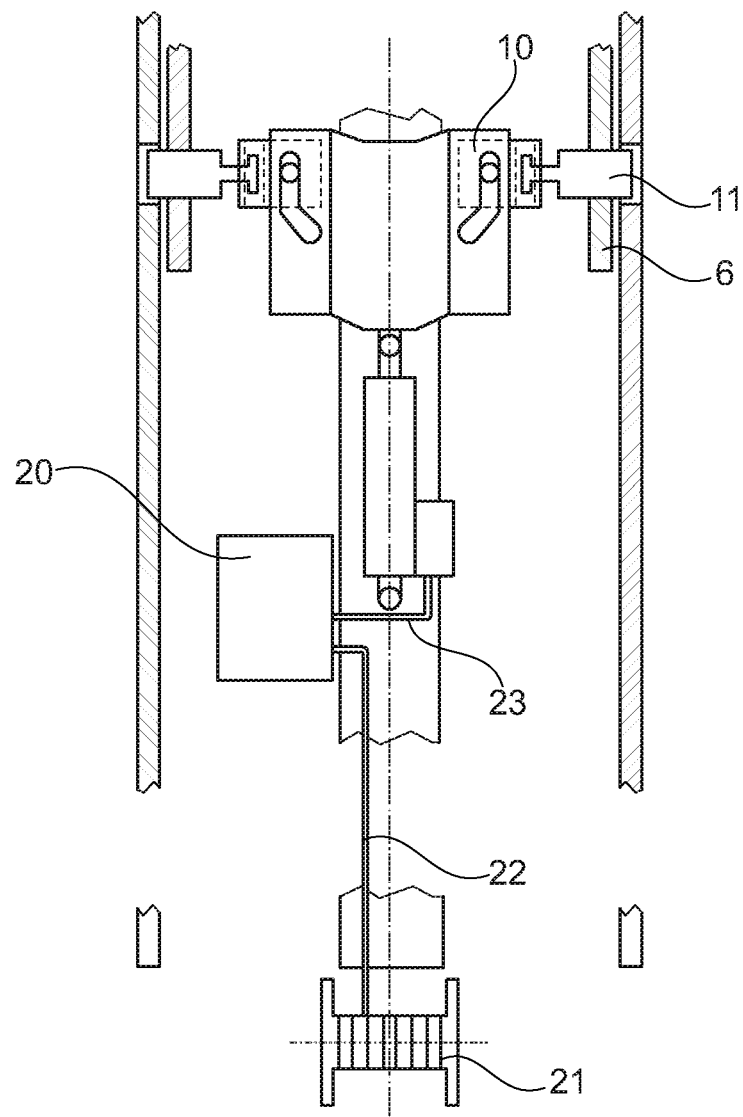
FIG. 3 shows the schematic plan view, in horizontal cross-section, of a telescopic cylinder according to FIG. 1, having a control unit which controls the electric linear drive and having an electric cable supplying the control unit with electric current, which cable can be rolled onto a cable drum, wherein the cable drum is located outside the telescopic unit, the control unit is disposed inside the telescopic unit.

In the embodiment according to FIG. 3, the electric control unit 20 is connected to the electric linear drive 4 via the electric cable 23 and is supplied with electric power via a further cable 22. The further cable 22 can be rolled onto the cable drum 21 and is therefore of variable length.

In the embodiments according to FIGS. 2 and 3, two mutually opposing securing and bolting holes of a combined securing and bolting unit 17 are provided. This securing and bolting unit 17 is provided with graspers 10, with which the locking bolts 11 can be brought radially outwards or inwards into either a locking or an unlocking position.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

The invention claimed is:

1. Crane jib with a locking system of a telescopic system, comprising:
    an outer telescopic section having a lower shell (2) and an upper shell (3);
    an inner telescopic section longitudinally displaced within the outer telescopic section, the inner telescopic section having an upper shell (6) and a lower shell (7); and
    a telescopic cylinder (1) at least partially received within the inner telescopic section, and the upper shell (3) of the outer telescopic section and the upper shell (6) of the inner telescopic section are each provided with a bolting hole (5) into which a locking bolt (11) is entered and withdrawn in a releasable manner via an electric linear drive (4) driving a sliding connecting member (14), provided with a sliding path (12) in which an engagement member (9) is guided, the engagement member (9) is in operating connection with the locking bolt (11), via a grasper (10), wherein the locking bolt (11) is moveable by the grasper (10) in connection with the engagement member (9) running in the sliding path (12) in such a way that the locking bolt (11) effects a linear movement and the upper shell (3) of the outer telescopic section is connected to upper shell (6) of the inner telescopic section by insertion of the locking bolt (11) into the bolting hole (5).

2. The device of claim 1, wherein the electric linear drive (4) is connected to a control unit (20) via a cable (23) and can thereby be controlled.

3. The device of claim 2, wherein the electric linear drive (4) is provided with integrated sensing system (4a) for location detection or with a separate position detection means (8a) for a connection of the sliding connecting member (14) to the linear drive.

4. The device of claim 3, wherein the electric linear drive (4) is provided with a mechanical self-locking means.

5. The device of claim 4, wherein the electric linear drive (4) is provided with a holding brake.

6. The device of claim 5, wherein the holding brake is formed as a self-locking means and holds a respectively approached position without application of electric power.

7. The device of claim 1, wherein the bolting arrangement of the telescopic sections (3, 6, 2, 7) is provided with two bolting holes (5).

8. The device of claim 7, wherein for the bolting of two telescopic sections (3, 6, 2, 7) to one another, two bolting holes are provided in each case, wherein the lateral bolting holes (5) are disposed opposite one another and are bolted to one another by a respective dedicated locking bolt (11).

* * * * *

UNITED STATES PATENT AND TRADEMARK OFFICE
CERTIFICATE OF CORRECTION

PATENT NO. : 9,637,359 B2  
APPLICATION NO. : 14/537065  
DATED : May 2, 2017  
INVENTOR(S) : Klein et al.

Page 1 of 1

It is certified that error appears in the above-identified patent and that said Letters Patent is hereby corrected as shown below:

On the Title Page

Item (73) Line 2 of Assignee, delete "Schafthausen", Insert --Schaffhausen--

Signed and Sealed this  
Twenty-first Day of August, 2018

Andrei Iancu  
*Director of the United States Patent and Trademark Office*